US008479597B2

(12) United States Patent
Pickel

(10) Patent No.: US 8,479,597 B2
(45) Date of Patent: Jul. 9, 2013

(54) THERMAL TEST CHAMBER

(76) Inventor: Michael B. Pickel, Dearborn, MI (US)

( * ) Notice: Subject to any disclaimer, the term of this patent is extended or adjusted under 35 U.S.C. 154(b) by 144 days.

(21) Appl. No.: 13/097,130

(22) Filed: Apr. 29, 2011

(65) Prior Publication Data

US 2012/0297904 A1    Nov. 29, 2012

(51) Int. Cl.
*G01N 17/00* (2006.01)
*G01M 7/06* (2006.01)

(52) U.S. Cl.
USPC .............................................. 73/865.6; 73/571

(58) Field of Classification Search
USPC .................................................. 73/571, 865.6
See application file for complete search history.

(56) References Cited

U.S. PATENT DOCUMENTS

| | | | |
|---|---|---|---|
| 3,327,536 A * | 6/1967 | Fitzgerald | 73/865.6 |
| 3,664,181 A | 5/1972 | Conrad et al. | |
| RE32,933 E | 5/1989 | Vander Schaaf | |
| 5,251,497 A | 10/1993 | Bressan | |
| 5,511,434 A | 4/1996 | Baker et al. | |
| 5,540,109 A * | 7/1996 | Hobbs | 73/865 |
| 5,582,095 A * | 12/1996 | Rial | 99/483 |
| 5,610,344 A | 3/1997 | Ueda et al. | |
| 5,637,812 A | 6/1997 | Baker et al. | |
| 6,048,099 A * | 4/2000 | Muffett et al. | 383/20 |
| 6,446,508 B1 * | 9/2002 | Peterson et al. | 73/571 |
| 6,863,123 B2 | 3/2005 | Wang et al. | |
| 6,904,807 B1 * | 6/2005 | Butts | 73/662 |
| 8,079,267 B2 * | 12/2011 | Henderson et al. | 73/663 |
| 2012/0155022 A1 * | 6/2012 | Alcala et al. | 361/692 |

* cited by examiner

*Primary Examiner* — David A Rogers
(74) *Attorney, Agent, or Firm* — Vincent Re PLLC; Vincent Re

(57) ABSTRACT

A soft-sided thermal test chamber that is readily mountable upon/over a shaker test table. The test chamber includes four interconnected insulated side walls and a top which define an enclosure. A two-piece bottom receives the side walls to fully enclose the test object upon the table. The two-piece bottom includes an interchangeable center piece which is sized to accommodate various tables or test objects. The side and top pieces are hung from a frame that is readily lifted using an overhead crane or chain fall hoist to allow easy access to the table during set up. The bottom and side walls are interconnected via hook and loop fasteners, which allows for rapid alteration of the set up of the test equipment while maintaining a thermally sealed chamber.

11 Claims, 7 Drawing Sheets

THERMAL TEST CHAMBER

FIELD OF THE INVENTION

This invention is related to thermal test chambers and, more particularly, to a thermal test chambers that are adapted to transmit a vibrational input to a test object.

BACKGROUND OF THE INVENTION

A variety of thermal testing chambers having various enclosure configurations have been previously disclosed to enable test personnel to subject a device or devices to different temperature conditions. Oftentimes, this thermal testing is combined with shock vibration testing to help ascertain the quality and reliability of the devices.

Vibration testing is conducted by mounting the device to be tested upon a table or base which is in communication with the thermal test chamber and by then vibrating the table. Some prior art examples of such thermal/vibration testing equipment may be found in the following patents.

U.S. Pat. No. 6,863,123 issued to Jeng-Yau Wang discloses a metal thermal testing enclosure that is lifted up off a rigid base plate. A rubber barrier allows the enclosure to be mounted upon/over a shaker table.

U.S. Pat. No. 5,251,497 issued to Elie Bressan discloses a test enclosure formed of a three-ply polyethylene material that is lifted via an overhead crane over the test stand. A sealing jacket is fixed to the floor surrounding the test stand. The sealing jacket mates with the lowered test enclosure to fully enclose the test stand. An airlock in the enclosure provides access to the test components while the enclosure is in position.

U.S. Pat. No. 5,610,344 issued to Ichiro Ueda et al. discloses an environmental test enclosure having a laminated insulated membrane. The enclosure has a rigid framework that is moveable like a curtain upon a rail system to allow access to the test stand.

While the prior art discussed above provide some solutions to the problem of providing a thermal test chamber that can be moved to provide greater access to the test stand, they do not provide a modular thermal chamber that can be quickly adapted to different vibrational test stands and which is provides unhindered access to the test objects.

One shortcoming of the prior art and commercially available thermal test chambers is that they are formed with rigid enclosure walls, which are effective in maintaining a desired thermal chamber, but inherently limit access to the components to be tested. Further, these test chambers are oftentimes large, expensive, fixed pieces of equipment that occupy a dedicated portion of the testing facility.

There is therefore a need for a thermal test chamber that is readily adaptable to differently sized vibrational test stands, while remaining portable and relatively inexpensive.

SUMMARY OF THE INVENTION

The broad purpose of the present invention is to provide an improved thermal test chamber that is readily mountable upon a shaker test table. The test chamber includes a hood having a number of non-rigid insulated side walls and a top wall which define an enclosure. A flexible two-piece bottom receives the side walls to fully enclose the test object upon the table. The two-piece bottom includes an interchangeable center piece which is sized to accommodate various tables or test objects and a collar. The collar is sized to mate with the side walls to complete the enclosure. The bottom and side walls are interconnected via hook and loop fasteners, which allows for rapid alteration of the set-up of the test equipment while maintaining a thermally sealed chamber.

In the preferred embodiment, the thermal test chamber has non-rigid walls and bottom, which enable the hood and bottom to be quickly assembled using high temperature hook and loop fasteners. These walls and bottom are preferably formed by at least one layer of a thermally insulated textile, such as a silicone-impregnated fabric.

It is an advantage of the present disclosure to provide a thermal test chamber adapted to be mounted to a top surface of a vibration table for thermal and vibration testing of a test object mounted upon a test fixture. The chamber including a thermally insulated hood and base that are both formed from a pliable textile material. The hood has an internal test cavity with an open bottom end. The base has a bottom wall mounted flat upon the top surface of the vibration table and includes at least one mounting aperture through which the test fixture is coupled to the top surface. In operation, the hood is removably coupled to the base by a continuous fastener running around a lower periphery of the hood, which thermally seals the test fixture within the test cavity.

It is another advantage of the present disclosure that the preferred embodiment provides a portable thermal test chamber for mounting to a vibration table. The test chamber is preferably made from a flexible insulative material and includes a base having a flat bottom member and a collar which is removably coupled to the bottom member and forms a generally vertical continuous wall extending from the periphery of the bottom member; a non-rigid enclosure hood having a roof and a plurality of downwardly extending side walls which cooperatively define a cavity. It is along these side walls that the hood is removably coupled to the base's collar. The portable thermal test chamber uses a hoist coupled to the enclosure hood to lift the hood away from the base.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views and in which.

DETAILED DESCRIPTION OF THE INVENTION

Figure 1:
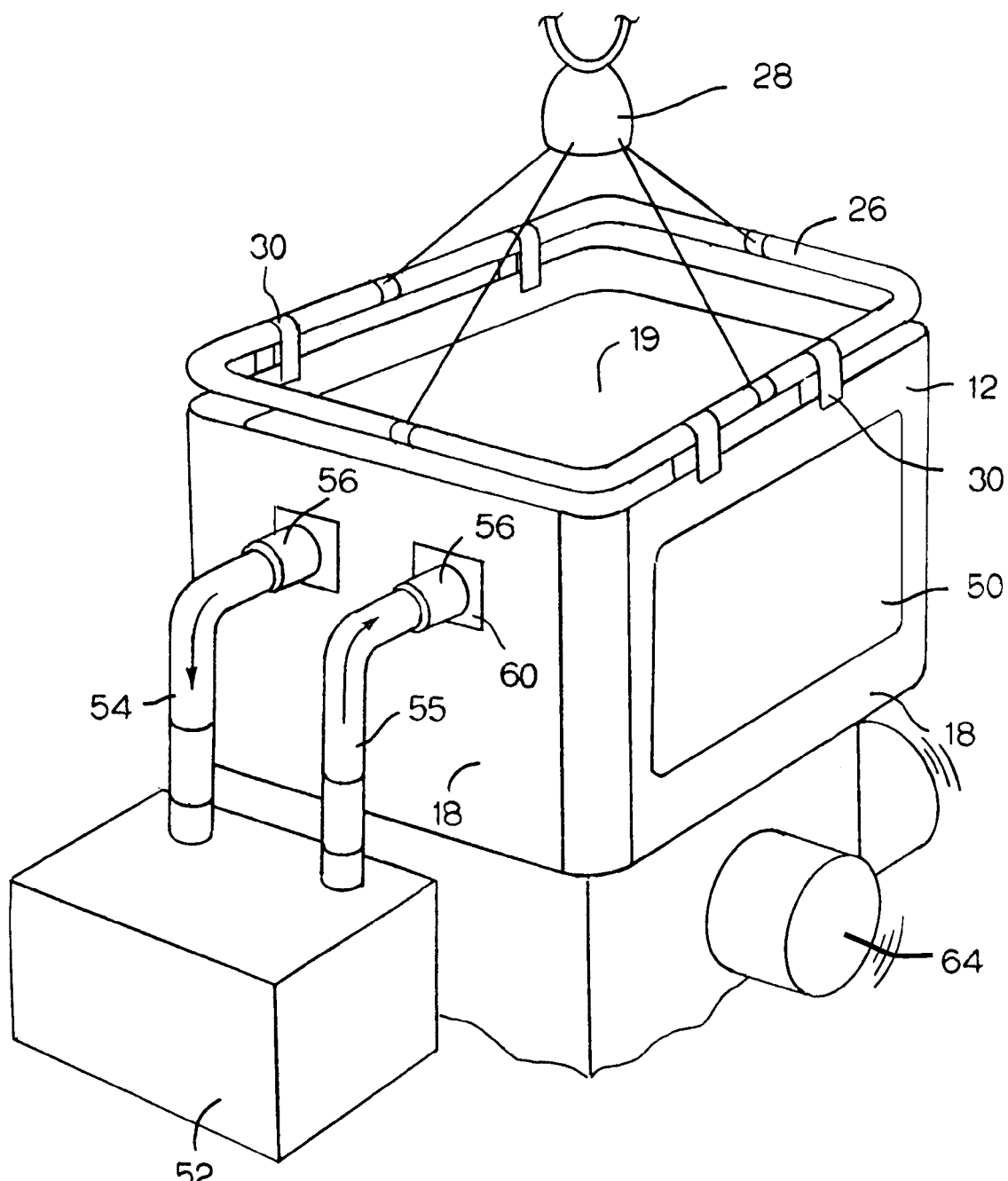
FIG. 1 is a perspective view illustrating the thermal test chamber suspended from a hoist and mounted upon a vibration stand and connected to a forced air heating and cooling unit.

Referring now to the FIGS., a thermal test chamber 10 is shown having an enlarged enclosure or hood 12 that is removably coupled with a two-piece base 14. To ensure that the test chamber 10 is relatively light in weight and remains readily portable, the walls and panels of the entire test chamber 10 are flexible and are preferably formed from a pliable insulative textile material surrounding a middle layer of pliable insulation batting. In the preferred embodiment, the outer layer 15 and inner layer 16 are a silicone-based fabric, such as a silicone coated or impregnated canvas. The center layer 17 is a dense fibrous insulation batting, such as a blend of cotton and nylon fibers. The thermal test chamber 10, through its combination of flexible insulative layers 15-17, remains pliable at a range of operating temperatures. Further, the flexible nature of the thermal test chamber 10 reduces the burden on packaging and shipping the test chamber.

The hood 12 has a generally rectangular box configuration with four opposed vertical side walls 18 coupled to a roof panel 19 spanning between and interconnecting the top portion of the four side walls 18. In one non-limiting example, the hood has a length of approximately eight feet and a width and height of approximately six feet.

The four parallel side walls 18 and roof 19 cooperatively define an enlarged test cavity 20 having an open bottom end opposed by the roof 19. As will be discussed in greater detail below, test cavity 20 is sized to receive a test fixture 22 that supports at least one test object or device 24.

As shown in FIGS. 1-4, hood 12 is vertically supported by a rigid tubular frame 26 which is itself coupled to a conventional lifting crane, dead-fall, or hoist 28. Frame 26 is preferably a continuous rectangular-shaped hoop having the same approximate profile as the four side walls 18 of the hood. The frame 26 is passed through a series of loops 30 fixed to and spaced along the upper end of hood 12. It should be appreciated that various configurations of lifting devices 28 and appropriate connectors may be envisioned by one skilled in the relevant art to effectively lift the hood 12 vertically at will.

Figure 4:
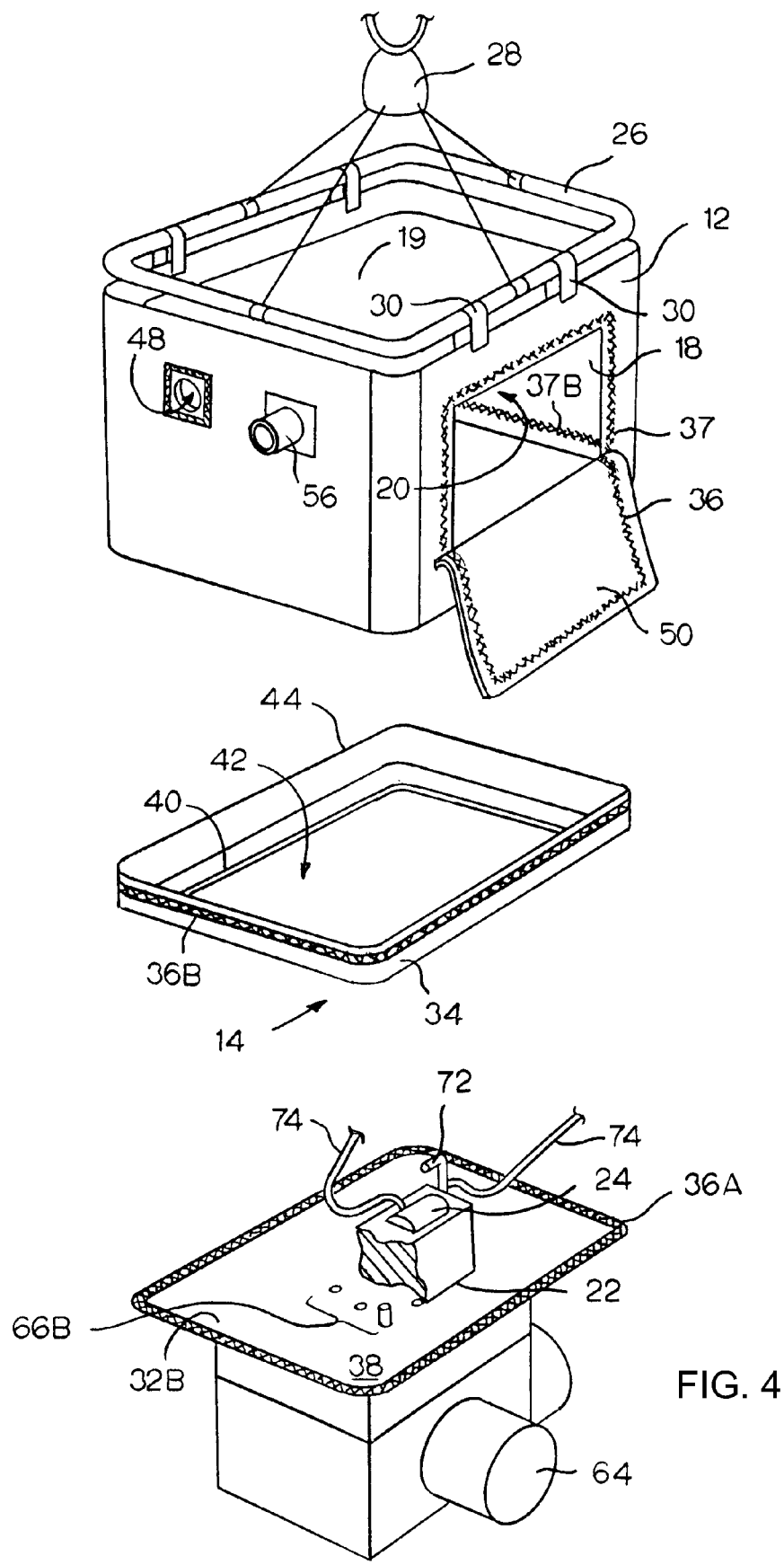
FIG. 4 is a partially exploded perspective view showing the hood separated from the base's collar and bottom panel.
Figure 5:
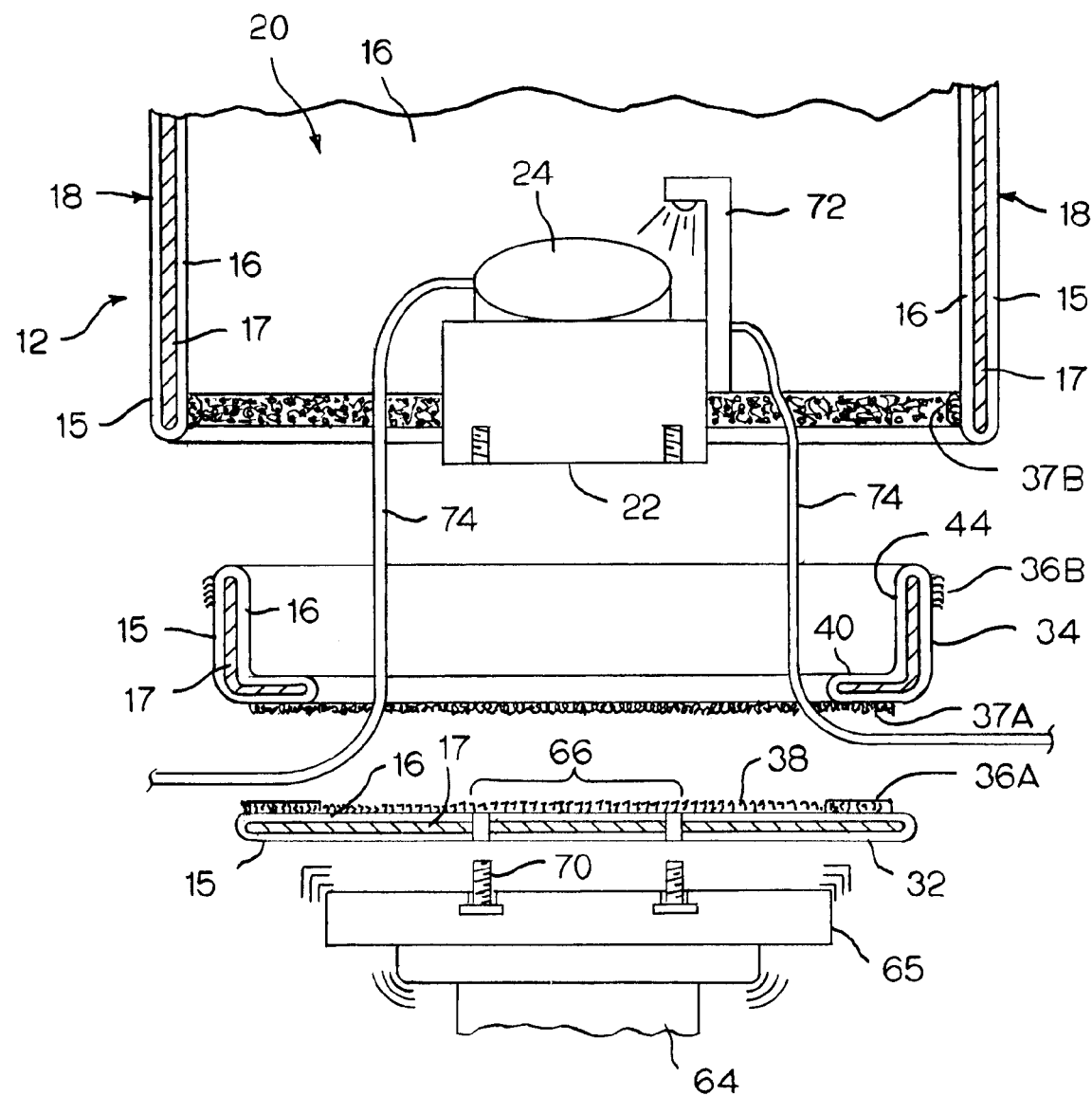
FIG. 5 is a partially exploded side sectional view of the hood, collar, bottom panel along with the test fixture, test object, cabling, and shaker table.
Figure 6:
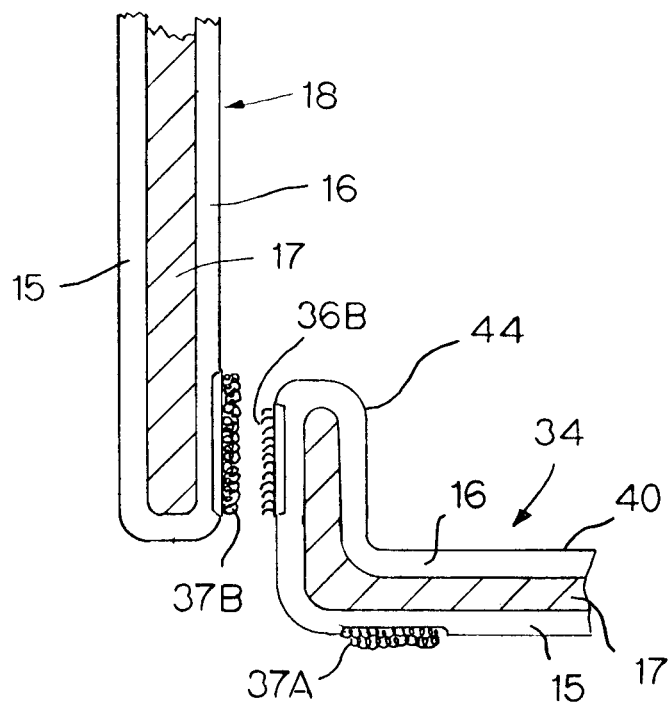
FIG. 6 is a side sectional view of the mating ends of the collar and hood.

As best shown in FIGS. 4 and 5, thermal test chamber 10 includes a two-piece base 14. The two subcomponents of base 14 include a relatively flat bottom panel 32 and an annular collar 34 that is removably mounted to the periphery of the bottom panel 32. Bottom panel 32 has a substantially planar rectangular shape. One continuous strip of half (denoted 36A on panel 32) of intermeshing fasteners 36, 37 runs around the entire periphery of the panel 32. Intermeshing fasteners 36, 37 are preferably a commercially available high strength, high temperature hook and loop fastener with a width of at least one-half inch. In the embodiment illustrated in the FIGS., one half 36A of the complementary intermeshing fasteners 36, 37 is affixed to the top surface 38 of the panel 32. It should be readily appreciated, however, that the fastener could be mounted to the bottom surface or side edge of a sufficiently thick panel.

The other subcomponent of base 14 is a collar 34. Collar 34 has a relatively narrow (e.g., 2 to 6 inches) mounting lip 40 that surrounds and defines a large opening 42. Lip 40 is generally horizontal and has an annular vertical wall or ring 44 depending from its outermost edge and rising vertically therefrom. In the embodiment illustrated in the FIGS., the underside of lip 40 has a complementary half 37A of the intermeshing fastener of panel 32 running around the lip and having the same general shape and size as the fastener 36A on bottom panel 32. To that end, lip 40 and bottom panel 32 are placed in an overlapping and abutting relationship and are readily coupled together with these intermeshing fasteners 36A, 37A with ring 44 extending vertically from the joined lip and bottom panel and with the opening 42 exposing most of top surface 38.

Another half of intermeshing fasteners 36, 37 encircles the outer surface of ring 44. This fastener half, denoted 36B in the FIGS., mates with its complementary strip half 37B running around the lower ends of the inward faces of the four side walls 18. To ensure that fasteners 36B, 37B are capable of forming a seal around the entire bottom end of cavity 20, lip 40 and ring 44 have the same relative lengths as the four interconnected walls 18, whereby the four walls 18 and outer surface of ring 44 are in an overlapping and abutting relationship.

Referring now to FIG. 5, a partially exploded side view of the hood 12, bottom panel 32, and collar 34 shows the relative positions of the mating fasteners 36A, 37A and 37B, 38B. When assembled, the hood 12 and base 14, have their parallel walls 38, 40 and 18, 44 in an overlapping and abutting relationship which, through their intermeshing fastener halves, produce a tight bond between the severable components 12, 32, 34. The intermeshing fasteners are preferably wide enough to hold fast while ensuring that little thermal energy (i.e., heat) escapes between the abutting panel surfaces, thereby producing a thermal seal that is satisfactory to substantially contain temperatures in the range of −50° F. to 275° F. within an enclosed cavity 20.

Importantly, to maintain a desired temperature within the above range, the hood 12 and base 14 are both formed from a flexible insulative textile material (i.e., the combined insulative layers 15-17, which is preferably interconnected by sewing adjacent panels (e.g., each side wall 18 and roof 19) together with a high-temperature thread, such as an alumina-boria-silica fiber or a PTFE thread.

Figure 2:
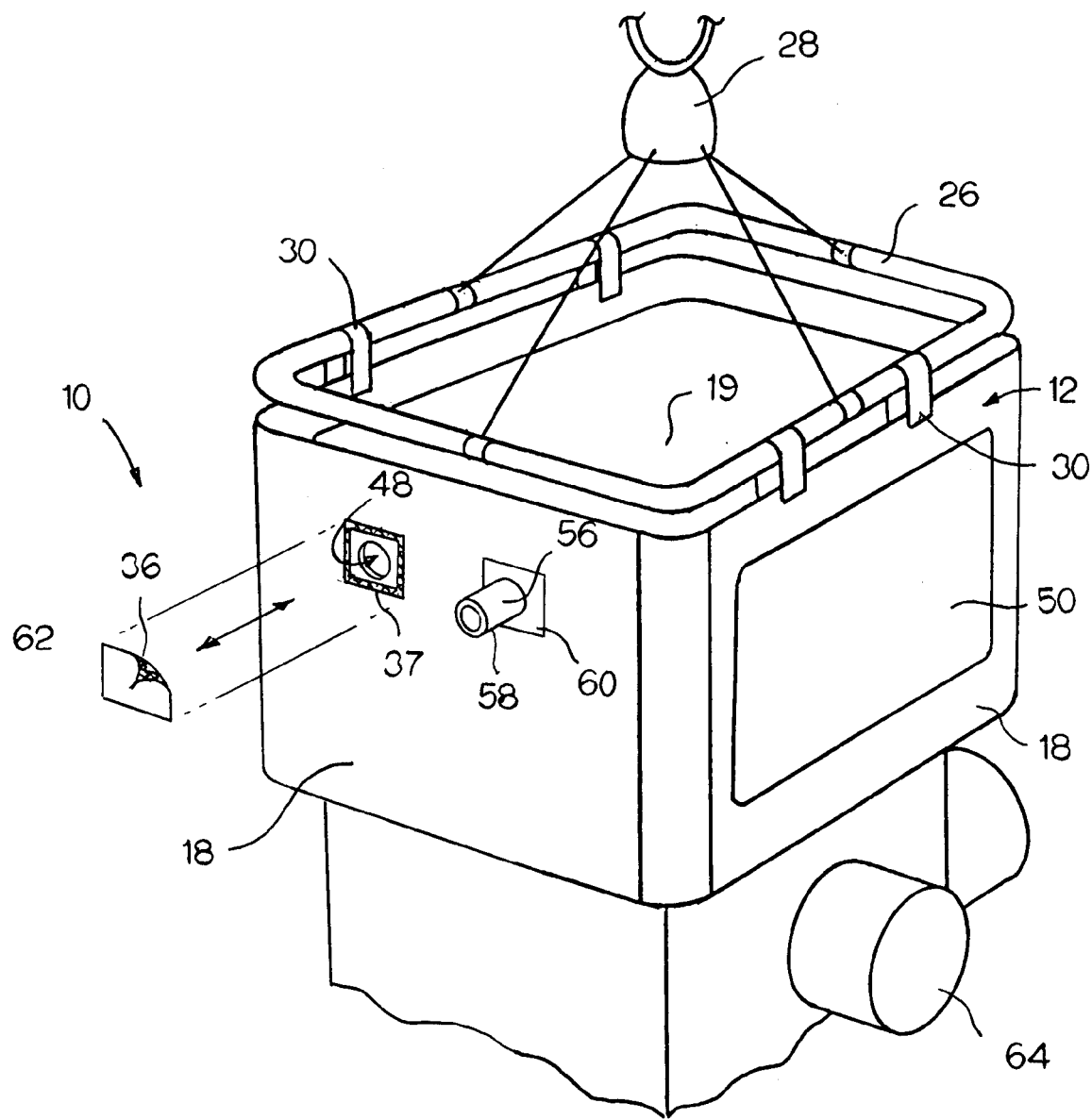
FIG. 2 is a view similar to FIG. 1, with the heating unit removed and showing a removable insulation panel prior to covering the exposed air port.
Figure 3:
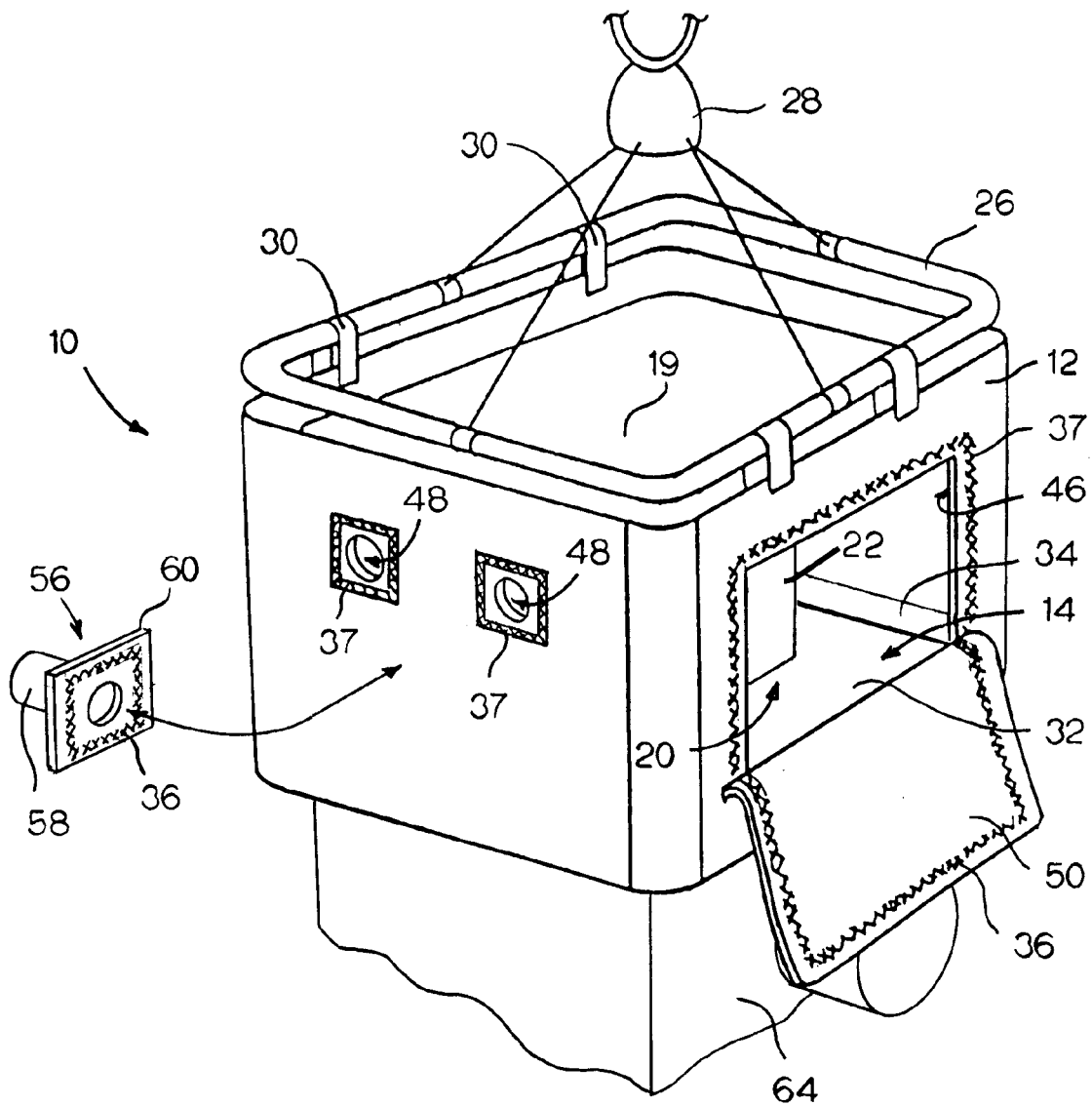
FIG. 3 is another perspective similar to FIGS. 1 and 2, showing a removable air duct adapter panel removed from the hood exposing the air port along with an enlarged access panel opened for access to the test fixture and test objects.

While initial set-up of test chamber 10 is preferably done with the hood 12 lifted free of the test fixture 22 and test object 24, there are often times when it is necessary to make adjustments and/or inspect the fixture or devices when the hood 12 is coupled to the base 14. Referring now to FIGS. 2 and 3, the thermal test chamber 10 includes a number of access apertures 46 and heating/cooling/return air ports 48 through the hood's walls 18. In the embodiment shown in the FIGS. a single access aperture and its door 50 is illustrated with a generally rectangular configuration that encompasses a majority of the surface area of one of the side walls of the hood. In this embodiment, the access aperture 46 and its door 50 have intermeshing fasteners 36, 37 running around three edges allowing the door 50 to be readily unsealed to gain access into cavity 20 through the enlarged aperture 46.

Similarly, a plurality of air ports or vents 48 is located in various locations around the test chamber 10 providing access into the cavity 20. These air ports 48 provide various locations for hot or cold air to be pumped into and extracted from cavity 20 by a conventional heat pump/refrigeration unit 52. Typically, hot and/or cold air is blown into and recovered by at least a pair of conduits 54, 55 which allow the test personnel to regulate the temperature within the cavity 20 during a test. Depending on the amount of air needed, various sized (i.e., diameter) conduits may be used for a given test. As shown in FIGS. 1-3, the air ports 48 formed in hood 12 are preferably large enough to accommodate a large range of conduits, while providing an adapter sleeve 56 having a tubular body 58 that frictionally receives a particular sized conduit 54, 55. The end of sleeve 56 that is opposite to the conduit-receiving end has a radially outwardly depending flange 60 that has intermeshing fasteners 36 fixed to its hood-abutting face. Complementary fasteners 37 are fixed around each air port 48 to allow the present invention to accommodate various modes of heating and cooling. When an air port 48 is not needed, a panel or cover 62 formed from the same insulating material as the hood 12 and having complementary fastener 36 around its inner face is fastened to the test chamber 10 to maintain a thermal seal.

Figure 9:
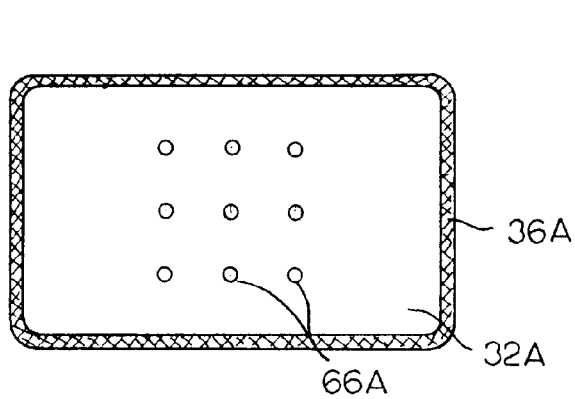
FIG. 9 is a top plan view of one bottom panel.
Figure 10:
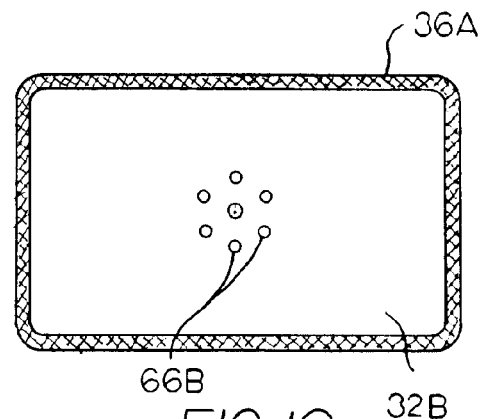
FIG. 10 is a top plan view of another bottom panel having a different fixture mounting pattern for a different vibrational test stand than the panel shown in FIG. 9.
Figure 11:
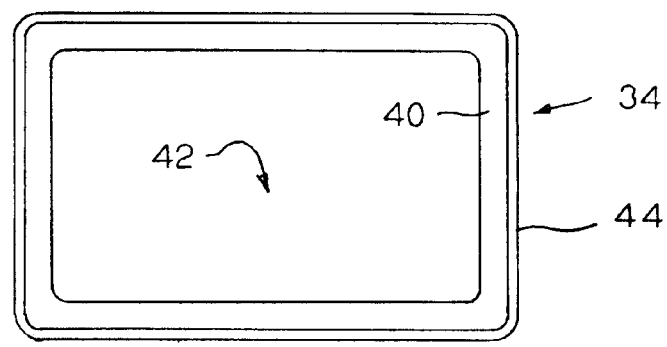
FIG. 11 is a top plan view of the base collar.

Referring back now to FIG. 4, the hood 12 is shown remote from a vibrational test stand or shaker table 64. The shaker table 64 includes a generally horizontal flat top plate 65, which is used as the mounting surface for the test fixture 22 that holds the test object 24. When preparing to conduct a test, the overall size and type of shaker table is determined along with the overall temperature settings to be used. Once a shaker table 64 has been selected for the test, a unique one of a number of differently configured bottom panels 32, such as panels 32A or 32B from FIGS. 9 and 10 is selected to coincide with the mounting hole arrangement 66A, 66B for the selected shaker table. The selected bottom panel, e.g., panel 32B, is placed upon the top plate 65, with the corresponding mounting holes 66B allowing the fixture-mounting hardware 70 to fix the fixture 22 to the shaker table 65 with the insulated panel 32 therebetween. In other non-limiting embodiment, mounting hole arrangement 66 may be eliminated with a generic opening granting direct mounting of the fixture 22 to the top plate 65.

Once the fixture 22 is mounted, the test object(s) 24 and any additional sensors or testing equipment 72 is mounted to the fixture or test stand. Typically, this equipment 72 has cables, cords, and/or tubing 74 which must pass out of the test chamber 10 to conduct the test.

Figure 7:
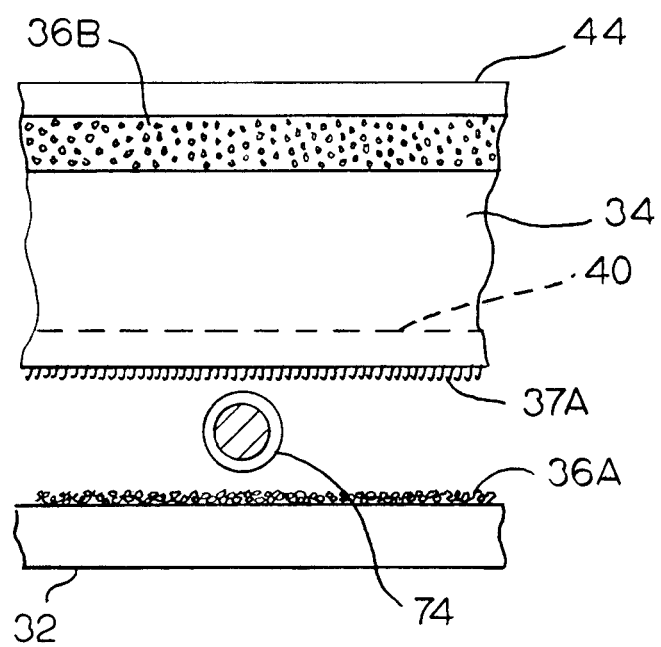
FIG. 7 is a side sectional view showing the collar and bottom panel prior to sealing over a test cable.
Figure 8:
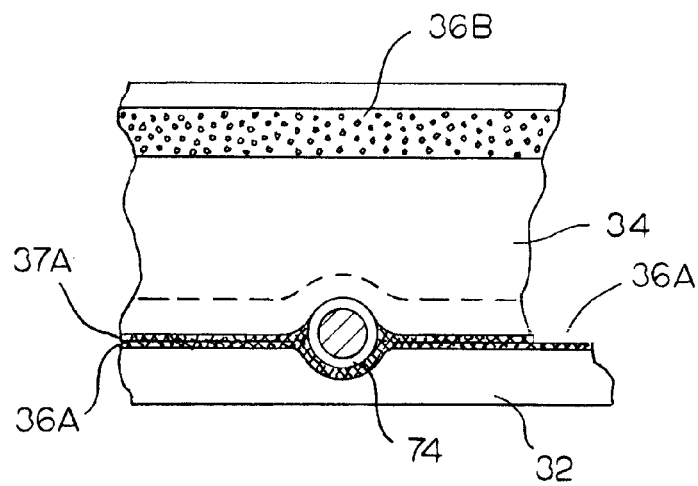
FIG. 8 is a side sectional view of the collar and bottom panel cooperating to thermally seal a test cable that is extending out of the test chamber's cavity.

The present invention provides an economical benefit of eliminating multiple thermal test chambers as a single hood 12 will envelop a large assortment of shaker tables 64, therefore once a particular bottom panel 32 is selected, a single collar 34 sized to mate with that hood 12 is sealingly coupled to the bottom panel 32 along 36A, 37A. As shown in FIGS. 7 and 8, the pliable fabric material of the hood 12 and base 14 of the present invention readily permits the testing personnel to place any cords, cable, and/or tubing 74 between the interconnecting fasteners 36, 37. The cords 74 are then sealing surrounded by the deformable fabric and continuous fasteners 36, 37 to substantially eliminate any significant heat loss through the abutting pliable surfaces (e.g., between panel face 38 and the underside of lip 40). The continuous fasteners 36, 37 allow the set-up personnel to fasten the mating components together up to each end of the protruding cord 74 to maintain the surrounding deformation of the panels.

As shown in FIG. 4, having the ability to lift a large portion of the testing chamber (i.e., the hood 12) up and away from the shaker table 64 during the initial set-up of the test greatly benefits the testing personnel as access to the entire test fixture 22, test object 24 and additional test equipment 72 is unhindered and thereby allows for more accurate set-ups and tests.

Lastly, the hood 12 is lowered over the set-up shaker table 64, the four side walls 18 are sealing mated to the raised annular ring 44 of the collar 34 and the heating/cooling conduits 54, 55 can then be affixed through the various air ports 48 and adapters 56.

From the foregoing description, one skilled in the art will readily recognize that the present invention is directed to a modular thermal test chamber, which provides unhindered access to the test objects and fixtures during set-up and which can be readily adjusted for various sized or configured vibration tables. While the present invention has been described with particular reference to various preferred embodiments, one skilled in the art will recognize from the foregoing discussion and accompanying drawings that changes, modifications, and variations can be made in the present invention without departing from the spirit and scope thereof as is more fully delineated in the following claims.

The invention claimed is:

1. A thermal test chamber adapted to mount to a top surface of a vibration table for thermal and vibration testing of a test object mounted upon a test fixture having fasteners which couple said fixture to said top surface, comprising:
   a thermally insulated hood formed from a pliable textile material, said hood having a test cavity with an open bottom end; and
   a thermally insulated base having a bottom wall formed from a pliable textile material, said base is mounted flatwise upon said top surface of the vibration table, wherein said base includes at least one mounting aperture through which said fixture is coupled to said top surface;
   wherein said hood is removably coupled to said base by a continuous fastener running around a lower periphery of said hood, effective to thermally seal test fixture within said cavity;
   wherein said base comprises a flat bottom panel and a collar member having a substantially vertical annular wall which is removably coupled to a peripheral edge of said bottom panel, wherein said hood is coupled to said base along said annular wall;
   wherein said hood is mated to said base by complementary hook and loop fasteners mounted around the annular wall and to a lower end of said hood to substantially thermally seal said cavity; and
   wherein said test fixture includes elongated cables located both within said cavity and extending from said cavity, wherein said hook and loop fasteners and said pliable textile materials of said hood and said annular wall cooperate to abutting surround each cable to permit said cables to exit said cavity while maintaining said thermal seal.

2. A thermal test chamber as defined in claim 1, wherein said hood includes a plurality of air port apertures, each aperture is selectively and thermally sealed by a removable panel which overlies said aperture when no air port is present.

3. A thermal test chamber as defined in claim 2, further comprising an air port adapter having an elongated tubular body and a mounting flange that depends radially outwardly from one end of said tubular body, wherein said air port adapter is removably coupled to said hood to cover at least one of said plurality of air port apertures with said tubular body extending away from the hood.

4. A thermal test chamber as defined in claim 3, further comprising a forced air heating and cooling system communicating with said cavity through said air port adapter for varying the temperature within the test cavity between −50 degrees Fahrenheit to 285 degrees Fahrenheit.

5. A portable thermal test chamber for mounting to a vibration table, comprising:
   a base including a flat bottom member and a collar which is removably coupled to said bottom member and forms a generally vertical continuous wall extending from the periphery of said bottom member;

a non-rigid enclosure hood having a roof and a plurality of downwardly extending side walls which cooperatively define a cavity, where the side walls are removably coupled to said collar; and hoist means coupled to said enclosure hood to lift said enclosure hood away from said base;

wherein said enclosure hood and base are both formed from a flexible insulative material;

wherein said enclosure hood is mated to said base by complementary hook and loop fasteners mounted around the periphery of said vertical wall and to said side walls to substantially thermally seal said cavity; and wherein said enclosure hood includes a plurality of air port apertures, each aperture is selectively and thermally sealed by a removable panel which overlies said aperture when no air port is present.

6. A portable thermal test chamber as defined in claim 5, further comprising an air port adapter having an elongated tubular body and a mounting flange that depends from and projects radially outwardly from one end of said tubular body, wherein said air port adapter is removably coupled to said hood enclosure to cover at least one of said plurality of air port apertures with said tubular body extending away from the hood enclosure.

7. A portable thermal test chamber as defined in claim 6, further comprising a forced air heating and cooling system communicating with said cavity via said air port adapter for varying the temperature within the test cavity between −50 degrees Fahrenheit to 285 degrees Fahrenheit.

8. A portable thermal test chamber as defined in claim 5, wherein said enclosure hood further includes an enlarged access opening formed in at least one of said side walls, said access opening is thermally sealed by an access panel which selectively overlies said access opening.

9. A portable thermal test chamber as defined in claim 8, wherein said access panel is formed from said flexible insulative material.

10. A thermal test chamber adapted to be mounted to a vibration table having an upper mounting surface for thermal and vibration testing of test objects, comprising:

a modular thermal enclosure having a hood with a plurality of side walls that extend away from a roof panel, the walls and roof panel are formed from a pliable silicone impregnated textile material and cooperatively define a test cavity having an open bottom;

a base having a flat bottom panel and a collar having a generally vertical wall depending from the periphery thereof;

a heating and cooling system communicating with the test cavity through at least one aperture in said hood for varying the temperature within the test cavity from an ambient temperature; and wherein said base is mounted atop said upper mounting surface and said hood is mated to said base along said vertical wall, thereby closing said open bottom wherein said hood is mated to said base by continuous loops of complementary hook and loop fasteners mounted along a lower periphery of said side walls and said vertical wall to substantially thermally seal said test cavity; and wherein said thermal and vibration testing of test objects includes sensors located within said test cavity, said sensors including elongated cables extending from said test cavity, wherein said hook and loop fasteners and said pliable material of said hood and said base cooperate to abutting surround each cable to permit the cables to exit the test cavity while maintaining said thermal seal.

11. A thermal test chamber adapted to be mounted to a vibration table having an upper mounting surface for thermal and vibration testing of test objects, comprising:

a modular thermal enclosure having a hood with a plurality of side walls that extend away from a roof panel, the walls and roof panel are formed from a pliable silicone impregnated textile material and cooperatively define a test cavity having an open bottom;

a base having a flat bottom panel and a collar having a generally vertical wall depending from the periphery thereof;

a heating and cooling system communicating with the test cavity through at least one aperture in said hood for varying the temperature within the test cavity from an ambient temperature; and wherein said base is mounted atop said upper mounting surface and said hood is mated to said base along said vertical wall, thereby closing said open bottom; and wherein at least one of said walls includes an enlarged opening which is selectively covered by an access panel formed from said pliable silicone impregnated textile material.

* * * * *